United States Patent
Hagenlocher et al.

(10) Patent No.: US 11,167,372 B2
(45) Date of Patent: Nov. 9, 2021

(54) AXIS CALIBRATION OF BEAM PROCESSING MACHINES

(71) Applicant: TRUMPF Laser- und Systemtechnik GmbH, Ditzingen (DE)

(72) Inventors: Tobias Hagenlocher, Ditzingen (DE); Thomas Kieweler, Wimsheim (DE)

(73) Assignee: TRUMPF Laser- und Systemtechnik GmbH, Ditzingen (DE)

( * ) Notice: Subject to any disclaimer, the term of this patent is extended or adjusted under 35 U.S.C. 154(b) by 210 days.

(21) Appl. No.: 16/124,975

(22) Filed: Sep. 7, 2018

(65) Prior Publication Data

US 2019/0015928 A1    Jan. 17, 2019

Related U.S. Application Data

(63) Continuation of application No. PCT/EP2017/055325, filed on Mar. 7, 2017.

(30) Foreign Application Priority Data

Mar. 9, 2016  (DE) .......................... 102016104318.4

(51) Int. Cl.
*B23K 26/04*  (2014.01)
*B23K 26/03*  (2006.01)
(Continued)

(52) U.S. Cl.
CPC ............ *B23K 26/032* (2013.01); *B23K 26/04* (2013.01); *B23K 26/0884* (2013.01);
(Continued)

(58) Field of Classification Search
CPC .. B23K 26/042; B23K 26/046; B23K 26/048; B23K 26/0604; B23K 26/0624;
(Continued)

(56) References Cited

U.S. PATENT DOCUMENTS 4,694,139 A * 9/1987 Roder ................ B23K 26/0884
219/121.67
5,156,382 A * 10/1992 Saeda ...................... B23Q 1/28
269/71
(Continued)

FOREIGN PATENT DOCUMENTS

CN       1522185 A    8/2004
CN     102394277 A    3/2012
(Continued)

OTHER PUBLICATIONS

International Search Report and Written Opinion in International Application No. PCT/EP2017/055325, dated Jul. 6, 2017, 21 pages (with English translation).
(Continued)

*Primary Examiner* — Hung D Nguyen
(74) *Attorney, Agent, or Firm* — Fish & Richardson P.C.

(57) ABSTRACT

In a method for determining a deviation of a spatial orientation of a beam axis (S) of a beam processing machine from a spatial nominal orientation (S0) of the beam axis (S), contour sections (KA1, KB2) are cut with a processing beam into a test workpiece from two sides of the workpiece. The contour sections (KA1, KB2) extend parallel to a nominal orientation of a rotation axis (B, C), where the rotation axis is to be calibrated. The contour sections (KA1, KA2) are probed from one side of the test workpiece by a measuring device for determining the spatial position of the contour sections (KA1, KB1). Deviation of the spatial orientation of the beam axis (S) of the beam processing machine from the spatial nominal orientation (S0) is determined based on the spatial positions of the contour sections (KA1, KB1).

17 Claims, 7 Drawing Sheets

(51) Int. Cl.
*B23K 26/08* (2014.01)
*B23K 26/10* (2006.01)
*B23K 26/38* (2014.01)
*B23K 26/70* (2014.01)
*B25J 9/16* (2006.01)
*B23K 26/21* (2014.01)
*G05B 19/401* (2006.01)
*B23Q 17/22* (2006.01)

(52) U.S. Cl.
CPC .............. *B23K 26/10* (2013.01); *B23K 26/21* (2015.10); *B23K 26/38* (2013.01); *B23K 26/705* (2015.10); *B23Q 17/2233* (2013.01); *B25J 9/1692* (2013.01); *G05B 19/401* (2013.01)

(58) Field of Classification Search
CPC ............ B23K 26/0626; B23K 26/0643; B23K 26/0648; B23K 26/142; B23K 26/702
USPC .............. 219/121.6, 121.65, 121.66, 121.68, 219/121.69, 121.85
See application file for complete search history.

(56) References Cited

U.S. PATENT DOCUMENTS

| | | | | |
|---|---|---|---|---|
| 5,340,962 A * | 8/1994 | Schmidt | ................. | B23K 26/04 219/121.78 |
| 5,536,916 A * | 7/1996 | Kohari | ................. | B23K 26/043 219/121.74 |
| 5,578,229 A * | 11/1996 | Barnekov | ................ | B27M 1/06 219/121.72 |
| 2003/0006220 A1* | 1/2003 | Cummings | ......... | C03B 33/0207 219/121.71 |
| 2003/0201578 A1* | 10/2003 | Li | ........................ | B23K 26/043 264/400 |
| 2008/0078751 A1* | 4/2008 | Abrott | ................. | B23K 26/032 219/121.69 |
| 2009/0265946 A1* | 10/2009 | Jordil | .................... | G01B 7/012 33/503 |
| 2010/0200552 A1 | 8/2010 | Mienhardt | | |
| 2011/0017716 A1* | 1/2011 | Rumsby | ............... | H05K 3/0026 219/121.72 |
| 2013/0178972 A1 | 7/2013 | Goldsmith et al. | | |
| 2014/0355005 A1* | 12/2014 | Goldsmith | ............. | B23K 26/00 356/614 |
| 2016/0158884 A1 | 6/2016 | Hagenlocher et al. | | |

FOREIGN PATENT DOCUMENTS

| | | |
|---|---|---|
| CN | 204449631 U | 7/2015 |
| DE | 19916081 A1 | 10/2000 |
| DE | 10150129 C1 | 4/2003 |
| DE | 102007037683 B3 | 11/2008 |
| DE | 102007063627 A1 | 4/2009 |
| DE | 102013217126 A1 | 3/2016 |
| JP | H04339582 A | 11/1992 |
| JP | H046328281 A | 11/1994 |
| JP | 2002001568 A | 1/2002 |

OTHER PUBLICATIONS

German National Examination Report in Application No. 102016104318.4, dated Oct. 28, 2016, 8 pages (with English translation).
JP Office Action in Japanese Appln. No. 2018-545845, dated Mar. 17, 2020, 6 pages (with English translation).
KR Office Action in Korean Appln. No. 10-2018-7029116, dated Mar. 26, 2020, 13 pages (with English translation).
KR Office Action in Korean Appln. No. 10-2018-7029116, dated Oct. 6, 2020, 7 pages (with English translation).
CN Office Action in Chinese Appln. No. 201780028745.0, dated Mar. 1, 2021, 9 pages (with English translation).

* cited by examiner

FIG 11

AXIS CALIBRATION OF BEAM PROCESSING MACHINES

CROSS REFERENCE TO RELATED APPLICATIONS

This application is a continuation of and claims priority under 35 U.S.C. § 120 from PCT Application No. PCT/EP2017/055325, filed on Mar. 7, 2017, which claims priority from German Application No. DE 10 2016 104 318.4, filed on Mar. 9, 2016. The entire contents of each of these priority applications are incorporated herein by reference.

TECHNICAL FIELD

This invention relates to multi-axis systems. The invention is directed to positioning beam axis of beam processing machines, in particular 5-axis laser systems for material processing. Furthermore, the invention relates to methods for zero point adjustment of rotational axes of such multi-axis systems.

BACKGROUND

In beam-based, especially laser-based, machine tools, exact positioning of a beam axis (e.g., laser beam axis or electron beam axis) is fundamental for precise processing of workpieces by a processing beam propagating along the beam axis onto the workpiece. In general, machine tools have translation systems and rotation systems that allow positioning and orienting of the processing beam with respect to the workpiece. For example, in so-called 5-axes laser systems, three orthogonal translation movements and two rotational movements are provided for the beam axis. In addition, translation and rotational movements can be provided for mounted workpieces.

When a machine tool is put into operation, the positioning systems and the beam path are usually initially set. The initial setting can be adapted, for example, to various (e.g., laser beam guiding) beam guiding components such as processing optics. Accordingly, a spatial orientation of a beam axis of the machine tool can be adjusted to correspond to a desired spatial orientation (nominal orientation) of the beam axis. Respective control parameters (also referred to as "processing parameters" herein) for various adjustment mechanisms such as stepper motors and drive disks are stored in one or more control devices, for example, in a Numerically Controllable (NC) control. As incorrect positions can occur during the operation of the machine tool, readjustment of the processing parameters may become necessary. Misalignments are due, for example, to a collision of a processing optics with the workpiece.

DE 10 2007 063 627 A1 discloses a method for determining the nozzle's central position. In that method, a frame is probed at first with the nozzle body and then with the laser beam. By comparing the values, the position of the laser beam relative to the opening of the nozzle can be determined. Furthermore, JP 6328281 discloses cutting a round hole, which is then probed with the nozzle to determine the nozzle's centering position.

SUMMARY

An aspect of the present invention is based on the objective of specifying a method that provides an at least partially automated adjustment of rotation axes in beam processing machines.

In an aspect, a method provided by the present disclosure includes determining a deviation of a spatial orientation of a beam axis of a beam processing machine from a spatial nominal orientation of the beam axis. The beam processing machine has rotation axis to be calibrated and a measuring device. The method includes: cutting contour sections by a processing beam of the beam processing machine into a test workpiece from two sides of the test workpiece, each of the contour sections extending parallel to a nominal orientation of the rotation axis that is to be calibrated; probing the contour sections with the measuring device from one side of the test workpiece to determine the spatial position of the contour sections; and determining the deviation of the spatial orientation of the beam axis of the beam processing machine from the spatial nominal orientation by comparing the spatial positions of the contour sections with nominal position values that are assigned to the contour sections when cut by the processing beam in the nominal special orientation.

In another aspect, a method relates to the determination of a deviation of a spatial orientation of a beam axis of a beam processing machine from a spatial nominal orientation of the beam axis of the beam processing machine for processing a workpiece with a processing beam guided along the beam axis. The beam processing machine is configured in particular to hold a plate-shaped test workpiece that has two surfaces defined by essentially common orientation of their surface normals. The beam processing machine includes at least one translation axis for producing a translation movement between the test workpiece and the beam axis, at least one rotation axis with a rotation range of at least 180° for orienting the beam axis in angular positions about a nominal orientation of the at least one rotation axis, and a measuring element. The method includes:

Mounting the test workpiece in a position in which the nominal orientation of the beam axis can be aligned in a first angular position and a second angular position rotated by 180° (to the first angular position) respectively along the orientation of the surface normal for processing the test workpiece, Positioning of the beam axis in a first position in which the nominal orientation of the beam axis is in the first angular position and the processing beam is directed onto one of the surfaces of the workpiece, Performing a first contour cut with the processing beam with a front side contour section extending parallel to the nominal orientation of the rotation axis, Positioning the beam axis in a second position, in which the nominal orientation of the beam axis is in the second angular position and the processing beam is directed onto the other one of the surfaces of the workpiece, Performing a second contour cut with the processing beam with a rear side contour section extending parallel to the nominal orientation of the rotation axis and, thus, parallel to the front side contour section, Forming at least one gap in the workpiece that borders on the front side contour section and/or on the rear side contour section, Probing the front side contour section and the rear side contour sections with the measuring element with the same angular position to detect the spatial position of the front side contour section and the spatial position of the rear side contour section, and Deriving the deviation of the spatial orientation of the beam axis of the beam processing machine from the spatial nominal orientation based on the spatial position of the front side contour section and the spatial position of the rear side contour section.

In another aspect, a beam processing machine for processing a workpiece has a workpiece mount for positioning a workpiece, in particular a test workpiece, and a beam guiding system for providing a processing beam guided along a beam axis onto the test workpiece. The beam processing machine has at least one translation axis for producing a translation movement between the test workpiece and the beam axis and at least one rotation axis with a rotation range of at least 180° for orienting (aligning) the beam axis in angular positions about a nominal orientation of the at least one rotation axis. Furthermore, the beam processing machine has a measuring element for probing a cutting edge and a control device for performing the above explained methods.

Additional features and their usefulness can result from the following description of embodiments on the basis of the drawings. The drawings show:

DETAILED DESCRIPTION

Aspects described here are partly based on the realization that kinematic set-up procedures for beam processing machines (e.g. laser-based machine tools) can be partially automated, especially with the help of a measuring nozzle that can cut to some extent. This concerns in particular the calibration of the B-axis and/or the C-axis and the determination of the nozzle's central position.

Furthermore, the concept disclosed herein is based on the aspect that an exact measurement of test cut paths, e.g. edges of a test rectangle, can become possible by a computational and/or measuring procedure by considering the coaxial offset between beam and measuring nozzle. Thereby, such concepts can make it possible to determine a potentially present kinematic error by using redundancies of axes. If needed, certain kinematic errors can be corrected within the framework of numerical control measures. The procedure described here refers in particular to a machine tool that has five numerically controllable (NC) axes, wherein the integration of further NC axes is generally possible. The workpiece processing is performed, for example, with a laser beam guided along a desired cutting path.

Usually the geometry of the kinematics of 5-axes laser machines is mathematically stored in the machine control. In particular, deviations from the ideal geometry are stored as offset dimensions of the laser's focus point, which is herein also referred to as TCP (Tool Center Point). This can be done based on, for example, the zero position(s) of one or more orientation axes for the transformation(s) between the workpiece reference system and the machine reference system. The zero positions are stored in the control device.

The concepts disclosed herein can, for example, enable semi-automated adjustment procedures for determination of the offset dimensions and the calibration of the orientation axes in order to determine and guarantee the exact position of the TCP in space. Based on the proposed concepts, the position of the laser beam in relation to the processing nozzle can also be detected and a concentricity of the laser beam in relation to the processing nozzle can be set. The adjustment procedures can also be implemented in a fully automatic manner using actuators at the processing optics. This can be done, for example, by moving a beam guide tube as well as by positioning a focusing lens within the processing optics.

Figure 1:
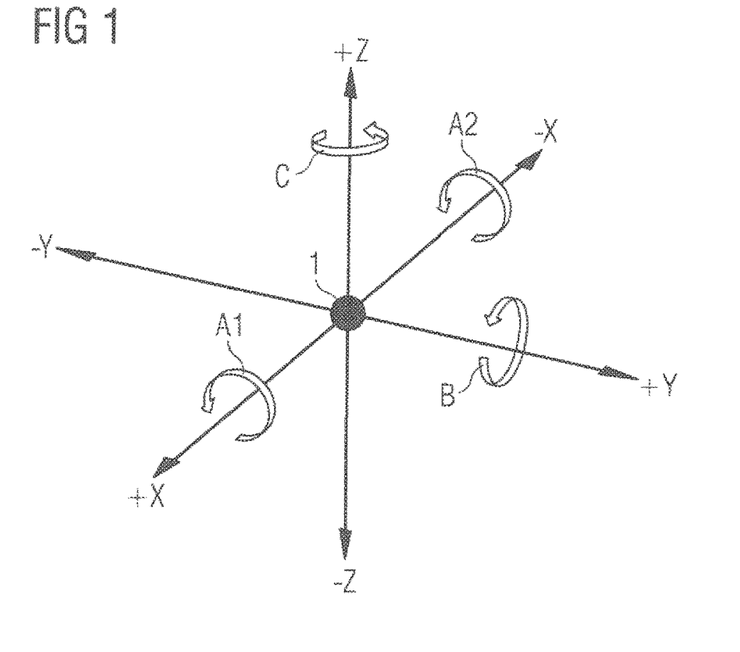
FIG. 1 depicts a schematic spatial illustration of a coordinate system of a 5-NC axes system for machine tools.

To illustrate the NC axes, FIG. 1 shows a machine reference system with an X axis for a horizontal travel movement of e.g. a boom along a machine body, a Y axis for a horizontal travel movement of, e.g., a Y slide, and a Z axis for a vertical travel movement of, e.g., a Z sleeve.

Furthermore, FIG. 1 indicates a possible swiveling movement of a processing optics around the Y axis, the so-called B axis. Usual swivel angles are in the range of, e.g., ±135°. Furthermore, FIG. 1 indicates a possible rotation movement of the processing optics around the Z axis, the so-called C axis. The C axis can allow single or multiple rotations of the processing optics. In the 5-axes laser machine TruLaser Cell 7000, for example, such movement options offer a highly flexible system for two- or three-dimensional cutting and welding.

In the zero position of the C axis shown in FIG. 1, the B axis extends along the Y axis. In the case of the illustrated machine reference system, the path information for the X, Y and Z axes refers to the coordinates with respect to a pivotal point 1 at the intersection of the B axis with the C axis. For example, an angular gear provides the rotations around the B axis and the C axis.

For completeness, FIG. 1 also shows examples of axes of movement for a mounted workpiece. An A1 workpiece axis allows a rotation movement of the workpiece in the left working area and an A2 workpiece axis allows a rotation movement of the workpiece in the right working area. For example, the workpiece can be clamped horizontally or vertically. For example, one or more of the translation axes X, Y, and Z can also be implemented by moving the workpiece.

Figure 2:
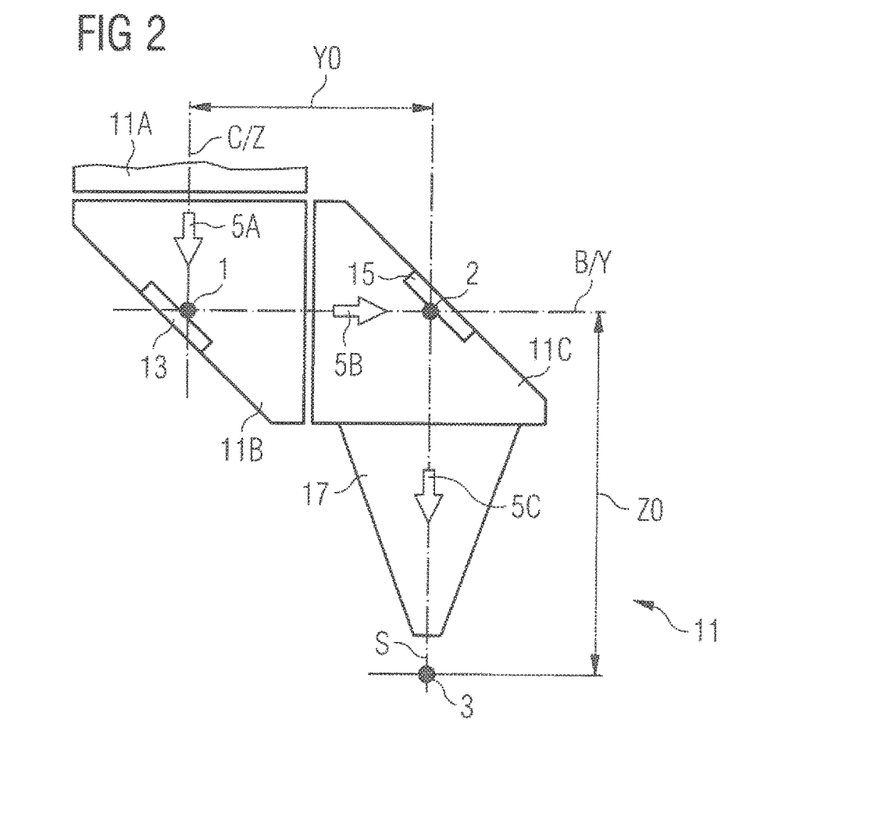
FIG. 2 depicts a schematic side view of an exemplary beam path in a beam delivery system with a processing head.

FIG. 2 shows an exemplary implementation of the B axis and the C axis with two angle setting units (not shown) for positioning and aligning a beam axis S emerging from a processing head 11. One can see the C axis extending along the Z axis, and the B axis extending in the drawing plane from left to right. A zero position of the C axis is assumed in FIG. 2, so that the B axis extends along the Y axis as in FIG. 1. The zero position of FIG. 2 is usually described with angle control parameters (B0, C0), i.e., there is no rotation angle (0°) for a rotation from the zero position for both the B axis and the C axis.

In an ideal case, the optical beam path extends along the C axis through a beam guiding unit 11A into a first deflection unit 11B. At pivotal point 1 on a first deflection mirror 13, the beam path is deflected to the B axis. The deflected beam enters a second deflection unit 11C. At a point 2 on a second deflection mirror 15, the beam path is deflected a second time. After being deflected for the second time, the beam path possibly extends through final focusing elements and a processing nozzle 17 attached to the second deflection unit 11C to a focus point 3. Focus point 3 was previously also referred to as TCP (Tool Center Point). The last section of the beam path defines the beam axis S for the workpiece processing. Processing nozzle 17 can be, e.g., a cutting, welding, or multifunctional nozzle for the corresponding processing modes of the machine tool.

In FIG. 2, the beam path is illustrated along the Z/C axis by an arrow 5A, between the pivotal point 1 and point 2 by an arrow 5B, and along the (final) beam axis by an arrow 5C. Assuming an ideal adjustment, the deflection at the deflecting mirrors is 90° in each case. The arrows 5A-5C show the propagation of a laser beam ideally coupled along the Z/C axis.

With the help of one of the angle setting units, the first deflection mirror 13 can be rotated about the Z axis and provides the degree of freedom of the C axis, wherein the pivot point 1 (assuming ideal adjustment) remains stationary. The second deflecting mirror 15 rotates with the first deflecting mirror 13. The deflecting mirror 15 can also be rotated using one of the angle setting units to provide the degree of freedom of the B axis. Assuming the ideal adjustment, point 2 remains stationary during rotation only about the B axis.

In the zero position of the B and C axes shown in FIG. 2, TCP 3 is located at a distance Y0 along the Y axis and at a distance Z0 along the Z axis from pivotal point 1.

The drive motors of the angle setting units of the B and C axes are, for example, motors with absolute encoders. These motors are usually referenced to the absolute position 0° when put in operation. If this referencing is lost, e.g., after a collision of the processing nozzle 17 with a workpiece, the NC axes, in particular the B axis and/or the C axis, must be referenced again.

To process a workpiece, TCP 3 is guided over the workpiece along a predetermined programmed path. The geometry of the kinematics of the processing beam relative to the workpiece is mathematically stored in the controller so that the corresponding axis positions of the drives in the machine reference system can be recalculated for a certain position and orientation of the laser beam in the workpiece reference system (transformation). The current kinematics describing the respective system can be stored in the controller with the help of a set of offset dimensions and can be taken into account during the transformation.

If a misalignment is suspected, the position of the B and/or C axis can be checked, e.g., by traversing a reference surface on the processing nozzle 17, for example, with a mechanical dial gauge for rough determination and alignment of the orientation of the B and C axes. If a deviation from a reference value is detected, the B and/or C axes are recalibrated. Furthermore, the B and/or C axes can be recalibrated at fixed time control intervals.

Figure 10A:
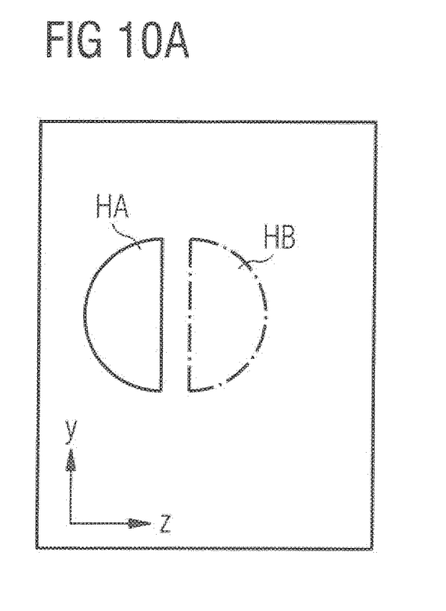
FIGS. 10A-10C are schematic illustrations of exemplary cutting contours.
Figure 10B:
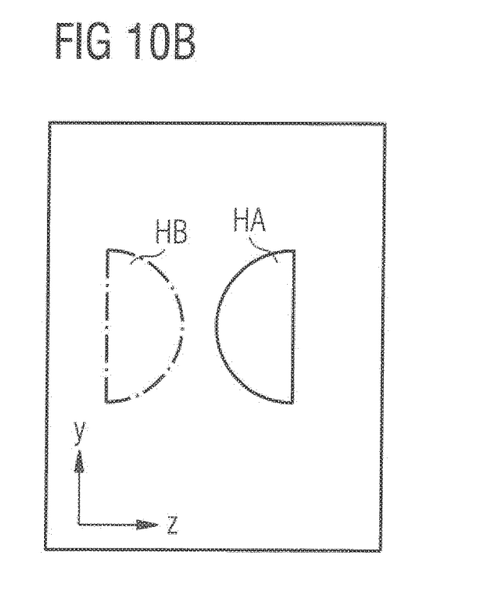
Figure 10C:
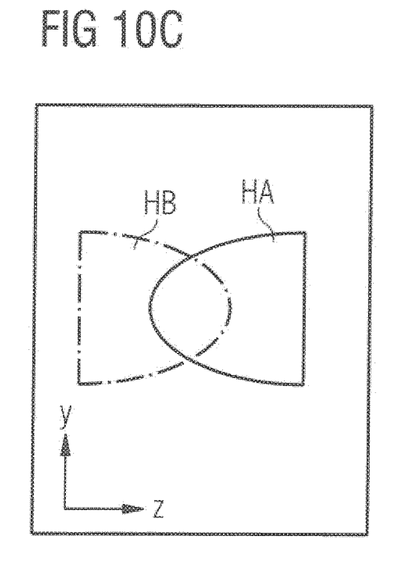
Figure 11:
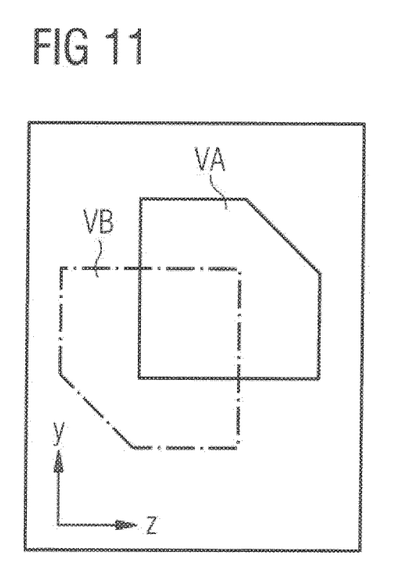
FIG. 11 is a schematic illustration of exemplary cutting contours with at least two pairs of opposing contour sections.

With reference to FIGS. 3 to 9, an exemplary (semi-)automated B and/or C calibration for setting the angle control parameters, in particular the zero position of the B and C axes, is described. Then, FIGS. 10 and 11 illustrate cutting contours that can be used for a B and/or C calibration.

A BC-calibration allows the absolute positions of the drives for the B axis and the C axis to be set. The calibration is explained in more detail using the B-axis calibration as an example. In general, the calibration concept proposed in this example can be applied to only one rotation axis (e.g., the B or C axis).

Figure 3:
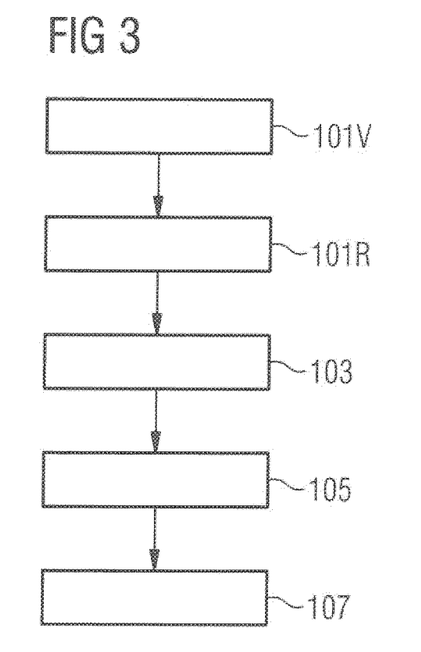
FIG. 3 is a schematic flowchart for illustrating an exemplary procedure of a BC correction according to the concepts disclosed herein.

FIG. 3 is a schematic flowchart for illustrating an exemplary procedure of a BC-calibration according to the concepts disclosed herein. The BC-calibration comprises a front side cutting process (step 101V in FIG. 3) and a rear side cutting process (step 101R), followed by probing processes (step 103), an evaluation (step 105), and optionally thereafter, the transfer of new zero point parameters (step 107).

The calibration is based on probing (performed from one side) a cut out section previously made on a test workpiece from two sides. The geometry of the nozzle in the area of the spatial probing is a given input parameter for ensuring that the measured value of the probing can be easily processed. For example, the processing nozzle 17 can be replaced by a measuring nozzle, or a measuring nozzle extension can be mounted on the processing nozzle 17 or the geometry of the processing nozzle 17 can be formed accordingly. In general, the geometry of the nozzle/measuring nozzle is available to the data processing as information to be considered or can be read using an RF-ID of the nozzle. The cutting processes presume in particular that the processing beam does not touch on the nozzle and that a certain minimum beam centering is respectively given.

Figure 4:
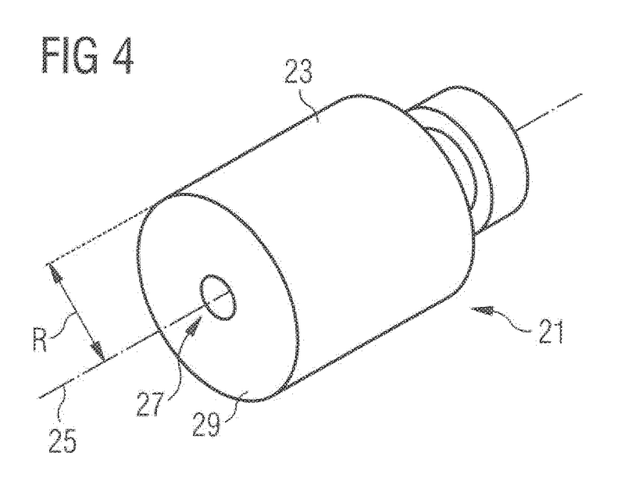
FIG. 4 depicts a 3D view of an exemplary measuring nozzle.

FIG. 4 shows an exemplary measuring nozzle 21 that has a geometry favorable for the probing procedure. The measuring nozzle 21 is cylindrical. A cylinder surface 23 extends along the cylinder axis at a radial distance R. In the mounted state, the processing beam passes through the measuring nozzle 21 in a beam guide opening 27 and the cylinder axis forms an ideal beam position 25 (nominal orientation). The cylinder surface 23 allows a lateral probing of an edge of a cut, wherein, when probing in opposite directions, there is essentially always the same offset of the ideal beam position 25 to the contact point on the cylinder surface 23, even for a non-orthogonal orientation of the measuring nozzle to a measuring plane. Furthermore, the measuring nozzle 21 has a circular front probing surface 29 that is defined and in particular extends essentially orthogonal to the ideal beam position 25. This can be used to roughly determine the position of the workpiece. It is also possible to determine the tool length, whereby the accuracy of the procedure can decrease with an increase of the radius R of the measuring nozzle. The measuring nozzle 21 is designed for cutting, i.e., it allows a contour to be cut out in a sheet, for example, having a thickness of 1 mm to 2 mm.

The distance control is based, for example, on a capacitive measurement. The capacity is formed between the cutting nozzle (or measuring nozzle) and the workpiece. The measured capacity can depend on the geometry of the workpiece surface as well as the nozzle used. If the nozzle is changed, a characteristic curve is usually recorded that describes the capacity formed in relation to the distance. If the geometry of the measuring nozzle differs from that of the cutting nozzle, the characteristic curve is usually recorded again for the current configuration. It is noted that the cutting quality can be influenced by the distance between nozzle and workpiece. As good edge quality is essential for accurate measurement, the result of the calibration can be adversely affected by an inadequate distance between the nozzle and the workpiece.

Figure 5:
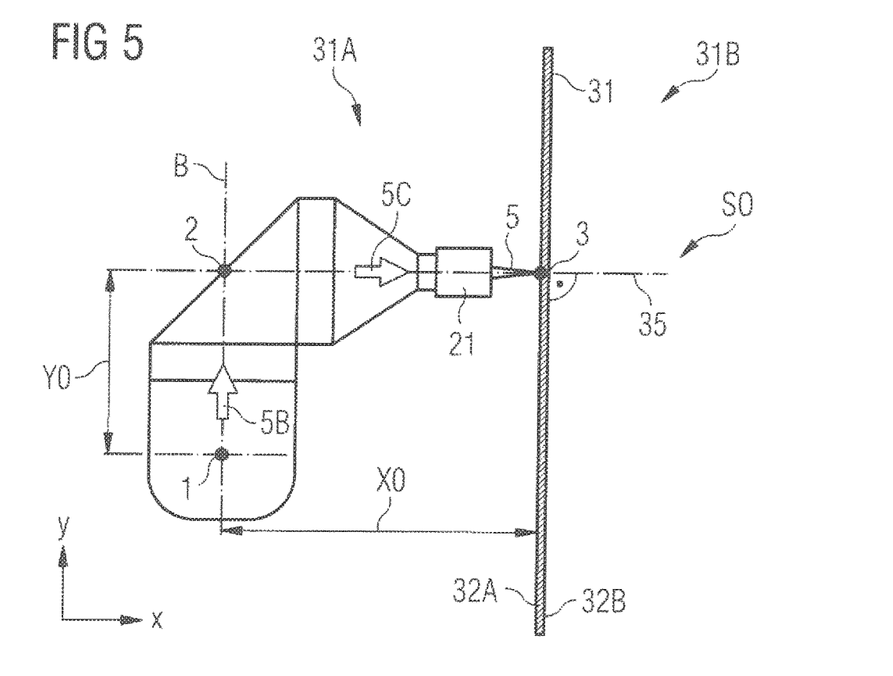
FIG. 5 depicts a schematic diagram for illustrating an exemplary cutting process with a machine tool.

FIG. 5 generally illustrates a cutting process with the orientation (the processing parameters) (B90, C0), as it can be used, for example, for the front side cutting process (step 101V) of the BC-calibration. A test workpiece 31 is clamped in a machine tool in the YZ plane of the reference system shown in FIG. 1. Surfaces 32A, 32B of the test workpiece 31 are correspondingly aligned in the (−X) direction (i.e., in the direction of a front side 31A with respect to the test workpiece 31) and (+X) direction (i.e., in the direction of a rear side 31B with respect to the test workpiece 31). The surfaces 32A, 32B have a corresponding orientation of the surface normal along the X axis. The test workpiece 31, for example, can be a flat test plate having a thickness of 1 mm, which can be cut with the measuring nozzle 21.

The illustration of the cutting process shown in FIG. 5 illustrates the situation of an ideal adjustment, i.e., the absolute positions for the B axis and the C axis are correctly set. Accordingly, the laser beam 5 hits orthogonal onto the test workpiece 31. FIG. 5 shows a corresponding ideal beam path 35 that is perpendicular to the surfaces 32A, 32B of the plate-shaped test workpiece 31. The beam axis S is also orthogonal to the test workpiece 31. The ideal beam path 35 ensures a nominal orientation S0 of the beam axis for each angle position of the B and C axes, whereby the nominal orientation S0 is stored as the processing parameters for the tool orientation.

In the zero position of the C axis shown in FIG. 5 and the 90° position of the B axis, TCP 3 is located at a distance Y0 along the Y axis and at a distance X0 along the X axis from the pivotal point 1. For the processing parameters (B90, C0), the distance X0 corresponds to the distance Z0 in FIG. 2. TCP 3 is located in the test workpiece 31, so that a contour can be cut into the test workpiece 31 with measuring nozzle 21. For illustration, a laser beam 5 focused into TCP 3 is schematically depicted in FIG. 5. With an ideal orientation, the beam path of the laser beam 5 extends along the B axis or along the beam axis 35 according to the arrows 5B, 5C as shown in FIG. 2.

Figure 6A:
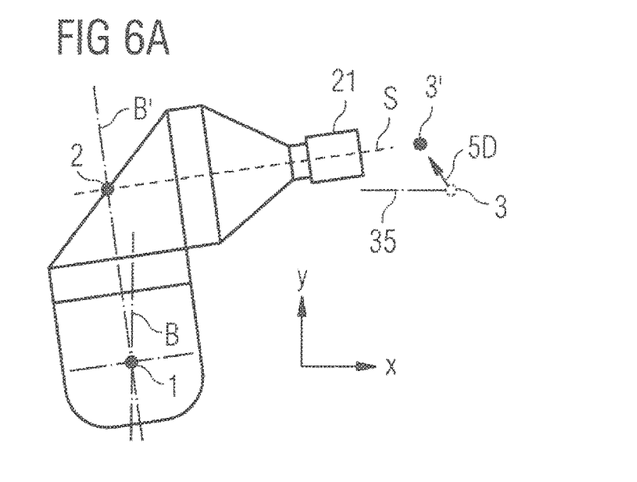
FIGS. 6A-6C depict schematic diagrams for illustrating erroneous tracks of a beam axis.
Figure 6B:
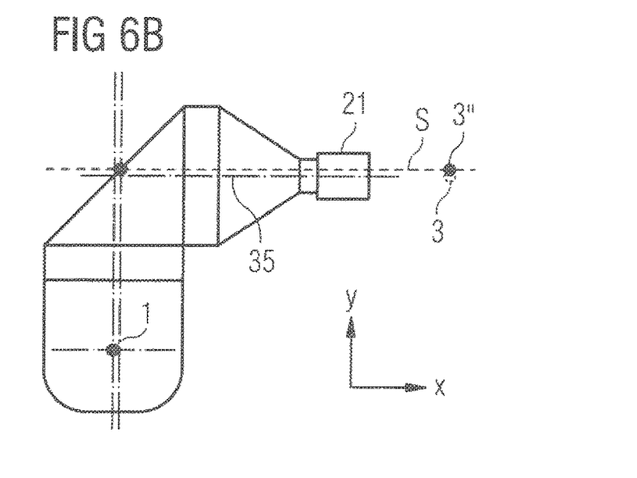
Figure 6C:
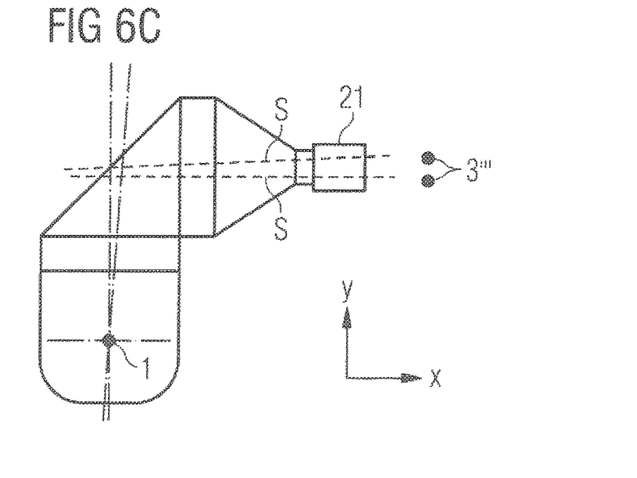

FIGS. 6A to 6C show possible erroneous paths of the beam axis with respect to the ideal orientation as shown in FIG. 5.

FIG. 6A illustrates the case where the angle setting unit of the C axis has been moved from the original zero position, for example, by knocking against a workpiece. In FIG. 6A, the new orientation of the beam axis in the case of an erroneous setting of the C axis and the correspondingly twisted B axis (dashed in FIG. 6A and marked with B') compared to the original orientation of the B axis in the Y direction (shown dashed dotted in FIG. 6A) is indicated by a rotation for a few degrees. The beam path including the 90° deflections by and the central passage of the beam axis S through the measuring nozzle 21 is not influenced by the impact, so that the beam comes to rest on TCP 3' a few degrees away from TCP 3 in the direction of the arrow 5D. The nominal orientation S0—illustrated in FIG. 6A by the ideal beam path 35—thus deviates from the orientation of the beam axis S by a rotation angle.

FIG. 6B illustrates the case that, e.g., by a displacement of the input beam parallel to the C axis, the deflection at the deflection mirrors 13, 15 by 90° is maintained, but the laser beam no longer extends along the original C and B axes. The direction and size of the beam displacement can depend (as mechanical deviation and/or optical error) on the respective orientations of the B axis and the C axis. As a result, the beam axis S is also shifted by a small beam offset but extends parallel to the ideal beam path 35. FIG. 6B shows a resulting TCP 3", which is shifted in the Y direction with respect to TCP 3. In FIG. 6B, one can also see the no longer central passage of the beam axis S through the beam guide opening 27 of the measuring nozzle 21. Alternatively or in addition, a displacement of the mirror 15 or the focusing optics can lead to an almost parallel beam displacement of the beam axis S, for example.

If the input beam no longer enters parallel to the C axis, an angular deflection of the beam axis S with respect to the ideal beam path 35 may be caused. When rotating around the C or B axis, this leads to a so-called beam stagger of the beam axis S around the ideal beam path 35. For the positions C0B90 and C0B-90, FIG. 6C shows the corresponding passages of the beam axis S through the measuring nozzle 21 with the associated TCPs 3''', given for illustration in a common figure.

The detection of such misalignments of the beam axis S and at least a partially automated correction of the misalignment is explained in more detail for the procedure described below for the BC-calibration. By an appropriate setting of processing parameters and cutting out from both sides, it becomes possible to obtain additional information in a probing procedure that takes place from one side. The information content can be used to identify a possible B and/or C misalignment, so that a respective correction of the misalignment can be made.

Figure 7:
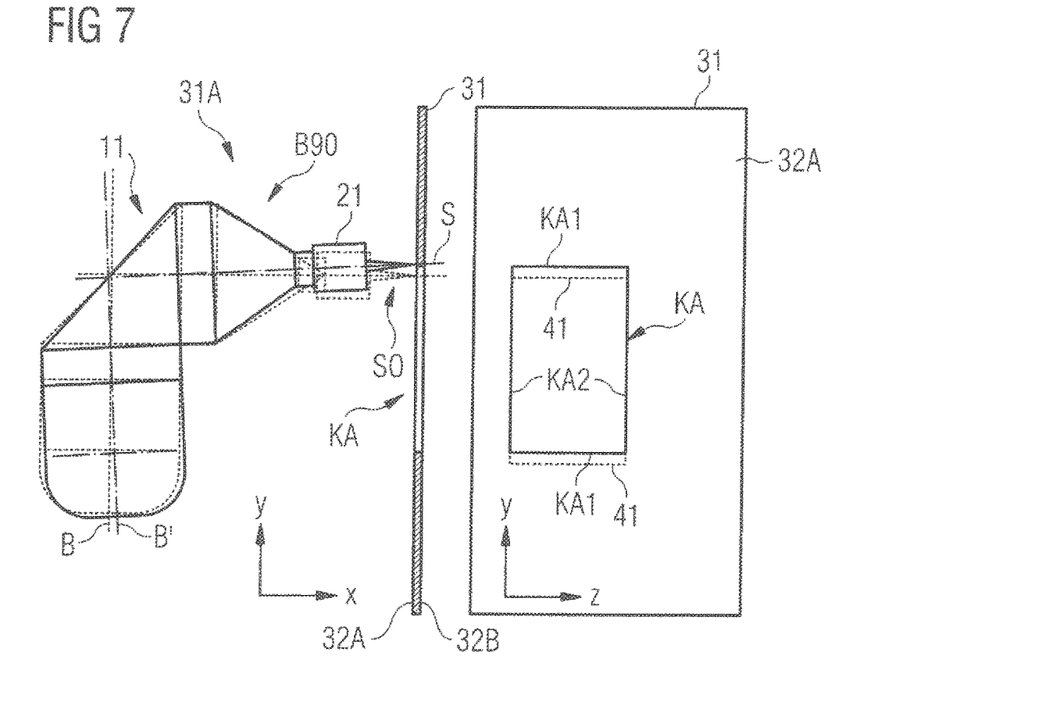
FIG. 7 depicts a schematic diagram for illustrating an exemplary front side cutting process.
Figure 8:
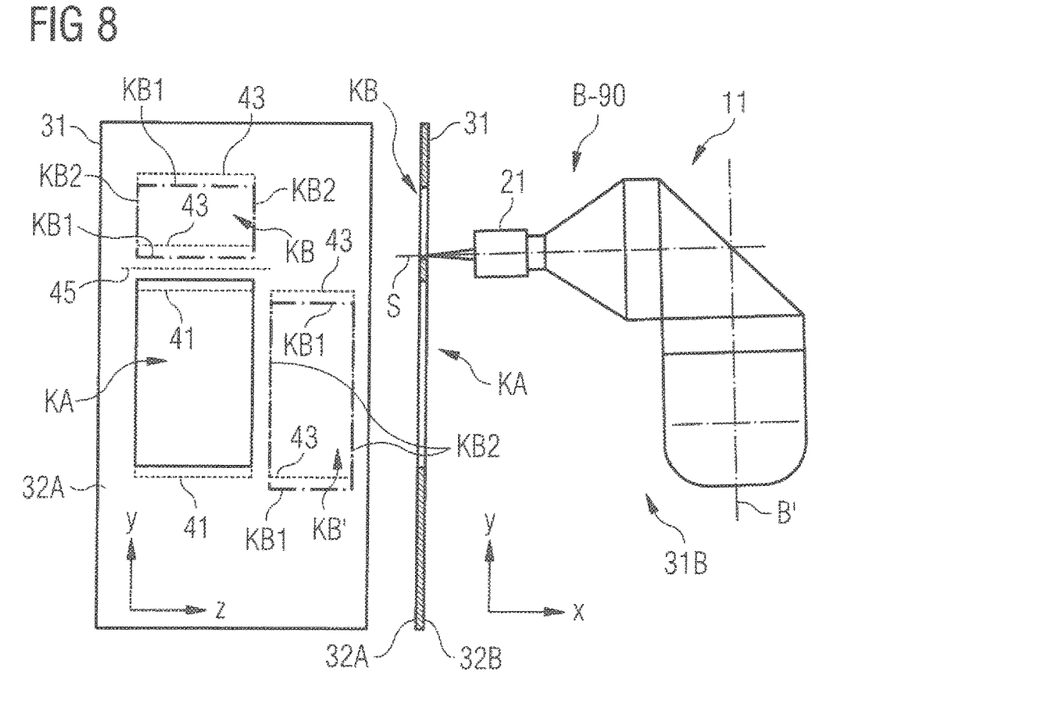
FIG. 8 depicts a schematic diagram for illustrating an exemplary rear side cutting process.

To explain the procedure for determining a deviation of a spatial orientation of the beam axis S of a beam processing machine from a spatial nominal orientation S0 of the beam axis (ideal beam path 35), the following FIGS. 7 and 8 assume a misalignment of the C axis (analog to FIG. 6A) as an example. Analogue considerations and correction procedures can also be carried out for a misalignment, e.g., of the B-axis or a superimposition of C- and B-axis.

FIGS. 7 and 8 each show a view of the X-Y plane (left side of FIG. 7 or right side of FIG. 8) and a side view of the test workpiece 31 (Z-Y view) for illustrating the contour cut made (right side of FIG. 7 or left side of FIG. 8).

It is assumed that the beam processing machine to be corrected is configured to hold the plate-shaped test workpiece 31. The test workpiece 31 is divided according to the machining space into a front side 31A and a rear side 31B with associated surfaces 32A, 32B of the test workpiece 31 (see also FIG. 5), which are essentially defined by an orientation of the surface normal. For the case of a plate-type configuration of the test workpiece 31 with plane-parallel surfaces 32A, 32B, the orientation of the surface normal represents the orientation of the surface normal on the surfaces 32A, 32B of the front side 31A or the rear side 31B.

The person skilled in the art will acknowledge that, for example, a slight wedge shape of the workpiece can also be used as long as this remains cutable, because in principle the slight wedge shape is also defined by an orientation of a surface normal and in this case by the wedge angle.

The beam processing machine also has at least one, for example three, translation axes for generating a 3D translation movement between the test workpiece 31 and the beam axis S and at least one rotation axis with a rotation range of at least 180° for orienting the beam axis in angular positions about a nominal orientation of the rotation axis (see also FIG. 1). A second, for example, orthogonal rotation axis can also be provided by the beam processing machine. The beam processing machine also includes a measuring element. In the case shown in FIGS. 7 and 8, this is the measuring nozzle 21.

FIG. 7 shows a selected mounted position of the test workpiece 31, in which the nominal orientation (S0) of the beam axis can be aligned at a first angular position B90—shown in FIG. 7—and at a second angular position B-90 rotated by 180°—see FIG. 8—each time along the orientation of the surface normal for processing the test workpiece 31. The arrangements according to FIG. 7 and FIG. 8 are thus based on a rotation about the B axis for setting the processing parameters (B90, C0) in FIG. 7 and (B-90, C0) in FIG. 8.

For the front side cutting process (step 101V) of the BC-calibration, the processing head 11 is positioned with the measuring nozzle 21 "from above" on the front side 31A of the test workpiece 31. The processing head 11 is then oriented with the processing parameters (B90, C0) so that the measuring nozzle 21 is directed towards the surface 32A of the test workpiece 31 and the TCP 3 lies in the test workpiece 31 so that a contour can be cut into the test workpiece 31 with the measuring nozzle 21. Due to the erroneous setting about the C axis, however, the beam axis S is not orthogonal to the surface 32A of the workpiece 31. During the cutting process of step 101V, the processing head 11 remains on the front side 31A of the test workpiece 31 and processes a contour.

In FIG. 7, the beam axis S is thus generally positioned in a first position in which the nominal orientation S0 of the beam axis S is in the first angular position B90 and the beam axis S is directed at the front side 31A of the test workpiece 31 (not orthogonally) towards the surface 32A. In contrast, in FIG. 8 the beam axis S is positioned in a second position in which the nominal orientation S0 of the beam axis S is in the second angular position B-90 (rotated by 180° to the first angular position about the B axis) and the beam axis S on the rear side 31B of the test workpiece 31 (not orthogonally) is directed towards the surface 32B.

FIG. 7 shows the actual orientation of the beam axis S in solid lines, which is slightly twisted to the nominal orientation due to the erroneous positioning of the C axis. In addition, to illustrate the erroneous positioning of the beam axis S in FIG. 7, the positioning of the beam supply and the processing head 11 is highlighted in gray with the nominal orientation S0 of the beam axis S in the case of the ideal orientation.

With the angular misalignment shown in FIG. 7, in the cutting process (step 101V) a contour KA with at least one front side contour section extending parallel to the nominal orientation of the rotation axis (zero position) is cut out. This is generated by carrying out a translational movement of the beam axis S along the assumed nominal orientation/zero position of the rotation axis during the cutting process.

According to the view of the Z-Y plane in FIG. 7, right side, the contour KA, for example, comprises two front side contour sections KA1 running parallel to the C-axis zero position, i.e. along the Z-axis, and two front side contour sections KA2 extending parallel to the (ideally aligned) B-axis zero position, i.e., along the Y axis, which form a rectangular cut-out section in the test workpiece 31.

As the C axis has been misaligned and despite the setting of the processing parameters (B90, C0) illustrated in FIG. 5, the beam axis S is rotated counterclockwise by a few degrees with respect to the orientation of the surface normal of the test workpiece 31, i.e., the laser beam does not hit the test workpiece 31 orthogonally. This results in the cut contour KA being displaced in its position in the (+Y) direction. FIG. 7 shows the cut contour KA as a solid line(s) in the Z-Y view. In addition, the (nominal) position of the rectangle for ideal orientation is indicated by dotted lines 41.

The cut out rectangle represents a contour cut with two pairs of opposite front side contour sections KA1, KA2, each extending parallel to the ideal C or B axis, i.e., parallel to the Z or Y axis. It can be seen that the misalignment of the C axis does not affect the Z positions of the contour sections KA2 extending in the Y direction (i.e., along the ideal B axis).

The information content of these contour sections KA1, KA2 generated on one side is limited in that it does not allow differentiation between a beam offset according to, e.g., FIG. 6B and a rotational position error according to FIG. 6A.

For the following rear side cutting process shown in FIG. 8 (step 101R in FIG. 3)—after a corresponding translation movement—the processing head 11 with the measuring nozzle 21 is positioned "from above" at the rear side 31B with respect to the test workpiece 31 and the beam axis S is rotated 180° about the B axis so that the beam axis S is directed onto the surface 32B of the test workpiece 31 and the TCP 3 lies in the test workpiece 31. That means, for step 101R of the BC-calibration, the processing head is oriented with the processing parameters (B-90, C0). Then, one (or more) rear side contour(s) KB, KB' is cut into the test workpiece 31 with the processing beam 5 exiting from measuring nozzle 21. However, due to the erroneous position, the beam axis is not orthogonal to the surface 32B of the workpiece 31 even during the rear side cutting process. During the cutting process of step 101R, the processing head remains at the rear side 31B of the test workpiece 31.

With the processing parameters (B-90, C0), for example, two rectangles are cut into the test workpiece 31 as rear side contours KB and KB'. FIG. 8 shows the cut rectangles KB and KB' with dashed dotted lines in the Z-Y view. Furthermore, the (nominal) position of the rectangles is illustrated with dotted lines 43 for the ideal orientation. Due to the misalignment of the C axis and despite the setting of the processing parameters (B-90, C0), the beam axis S is also rotated counterclockwise by a few degrees with respect to the orientation of the surface normal of the test workpiece 31. Thus, the laser beam 5 does not hit the test workpiece 31 orthogonally and the cut rectangles KB and KB' are shifted in their positions in (−Y)-direction with respect to the rectangle positions with ideal orientation (lines 43).

An alternative starting position for the second cutting process can be taken, for example, with the processing parameters (B90, C180). The latter rotation about the C axis can also be used, for example, in implementations of the beam processing machine with only one axis of rotation (here the C axis) to provide positions for cutting the front side and rear side contours.

Each of the rectangles KB and KB' represents a contour cut with two pairs of opposite rear contour sections KB1, KB2, which run correspondingly parallel to the ideal C or the ideal B axis. It can be seen that the misalignment of the C axis does again not affect the Z positions of the contour sections KB2 extending in the Y direction (i.e., along the ideal B axis).

Assuming a central passage of the beam axis through the measuring nozzle 21, the upper and lower contour sections KA1, KB1 of the rectangle KA and the rectangle KB extending in the Z direction approach symmetrically a centerline 45 between the "ideal contour sections" in the (+Y) and (−Y) direction. It is noted that a pure beam displacement in the measuring nozzle 21 (according to FIG. 6B) would cause a displacement of the contour sections so that the contour sections would not get closer to each other or get apart from each other.

Summarizing the cutting processes, the contour sections provide information on rotation axis misalignment and/or beam displacement.

This is obtained in the probing procedures described below and the subsequent evaluation (step 103 in FIG. 3), where the probing procedures are performed from one side, for example with processing parameters (B-90, C0) from the rear side 31A.

Figure 9:
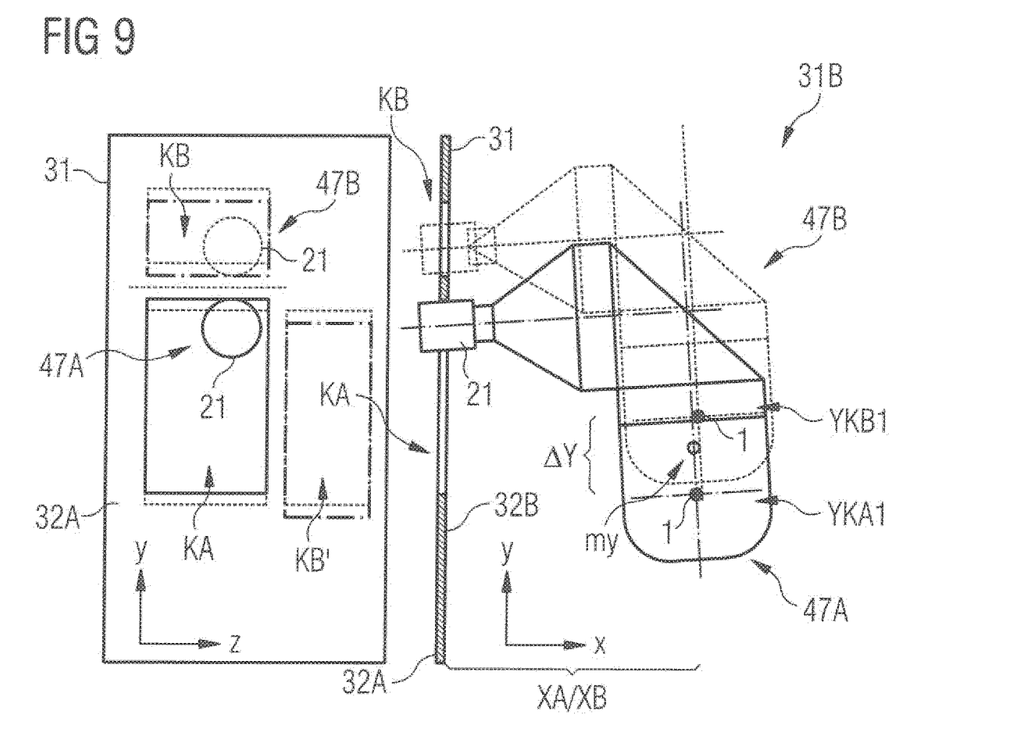
FIG. 9 is a schematic diagram for illustrating an exemplary probing process.

As in FIG. 8, FIG. 9 shows a side view of the test workpiece 31 (Z-Y view) to illustrate the probing of an edge and a view of the X-Y plane (right side of FIG. 8) to illustrate the position of the measuring nozzle 21. FIG. 9 shows, for example, a probing position 47A of the measuring nozzle 21 when probing the contour section KA1 (shown with solid lines) and a probing position 47B of the measuring nozzle 21 when probing the contour section KB1 (shown with dotted lines).

For probing the edges KA1 or KB1, the pivotal point 1 is positioned at a probing distance XA/XB from the surface 32B of the test workpiece 31, at which the measuring nozzle 21 projects into the respective cut out section. The probing distance XA/XB is selected such that the measuring nozzle 21 projects into the cut out rectangle KA, KB to such an extent that a lateral probing procedure always leads to contacting the edges with the shell surface 23. For the evaluation, for example, the associated Y and Z values of pivotal point 1 are recorded. Due to the cylindrical shape of measuring nozzle 21, the probing procedures are not influenced by the shape of the measuring nozzle, because both probing in the (+Y) or (−Y) direction involves an equal measured distance to the ideal beam axis (i.e., the cylinder axis through the measuring nozzle 21).

As the shell surface 23, or the associated cylinder axis of measuring nozzle 21, also extends under the tilt angle to the orientation of the surface normal, the tilting—as shown in FIG. 9—affects the first probing procedure in such a way that the Y position of the contour section KA1 is assigned a larger Y value of pivotal point 1 than in the case of ideal orientation. This means that the pivotal point 1 can move closer to the edge KA1 in the Y direction, in FIG. 9 up to the distance YKA1, than it would be the case with ideal orientation. Similarly, the pivotal point 1 can move closer to the edge of the contour section KB1 in the Y direction, in FIG. 9 up to the distance YKB1. This results in an actual distance $\Delta Y$ between the contour sections KA1 and KB1.

In the probing procedure described above, the same angular setting as that of the rear side cutting process is used. In this context, it should be noted that although the front side cutting process and the rear side cutting process generally take place with correspondingly inverted angular setting, the probing procedure could also be carried out with an angle position deviating from this, as long as both probing edges are probed with the same position.

One can see: The more the actual distance $\Delta Y$ of the contour sections KA1 and KB1 deviates from the assigned nominal distance, the greater the angular deviation of the C axis from the ideal adjustment. If the actual distance $\Delta Y$ is greater than the nominal distance, in the arrangement according to FIG. 9, it is a counterclockwise twist; if the actual distance $\Delta Y$ is smaller, it is a clockwise twist. From the direction of displacement of a measured center mY between the contour sections KA1 and KB1 from the ideal center line (e.g., a nominal center), one can deduce the beam displacement in the measuring nozzle 21.

In general, with the help of the known geometry, in particular of measuring nozzle 21, the X and Z positions of pivotal point 1, measured for the various contour edges, can be calculated to determine correction angles to be made with respect to the B and C axis. An exact measurement of the contour sections is made possible by mathematically considering of the coaxial offset between the beam axis and the measuring nozzle. The result of the measurement then makes it possible to determine the kinematic error using the axes redundancies, and the error can subsequently be automatically corrected in the NC control.

For example, the NC control calculates the actual angular position of the B axis and the C axis from the measured values and displays the corrected axis position on the user interface. After the values have been accepted by the operator, the control sets this axis position as absolute position, i.e., as the new "zero position", for further workpiece processing (step 107 in FIG. 3). A more precise determination of the new exact "zero position" is iteratively possible, for example. Thus, from a detected threshold value deviation of e.g. 0.02°, a correction can be carried out several times in order to arrive at a deviation of, e.g., less than 0.005°.

Advantages of the procedures disclosed herein include inter alia the possibility of automated processing of the test workpieces and subsequently automated measurement. Operator intervention may only be required to mount the measuring nozzle and the test workpieces and, if needed, to correct the nozzle centering. The remaining steps can be automated. This reduces the time required for checking/readjusting the BC axes, which is usually carried out every eight hours and after each collision. Furthermore, the susceptibility of the measurement procedure to errors can be reduced compared to manual measurement and transfer of the results to the controller.

In the described procedure, a measuring nozzle was used as a measuring device in the form of a tactile measuring element. The skilled person can easily realize that the procedure can also be carried out with other non-tactile detection methods, such as the use of electrical, magnetic, optical, or acoustic measuring devices. In particular, it is also possible to use detection with the laser beam itself as a supplemental means for detection.

Although translational movements of the processing head have been made in the procedure described above, the skilled person will easily recognize that alternatively one or more translational movements can also be taken over by a workpiece mount of the machine tool, so that instead of the processing head, the workpiece is moved linearly. Furthermore, in the example described above, the correction was determined using two rectangles, but the skilled person will easily recognize that alternative contour shapes can be used depending on the measuring procedure and the underlying beam processing machine.

In beam processing machines with only one rotation axis, only one linear beam section is required per contour cut. FIGS. 10A and 10B show examples of cut-out semicircles HA (from the front side) and HB (from the rear side), whose linear contour sections either form a centrally arranged bar to be measured (FIG. 10A) or provide an outer dimension to be measured (FIG. 10B).

In another embodiment shown in FIG. 10C, the semicircles HA and HB can partially overlap so that it is no longer necessary to move the measuring nozzle out of the cut-outs, i.e., to move it in the X direction, when changing from probing the front contour section to probing the rear contour section.

Structures for several rotation axes can also be provided. For example, FIG. 11 shows two overlapping polygons VA and VB, which each comprise contour section pairs in two spatial directions. Due to the overlap, it is not necessary to move the measuring nozzle 21 out of the plane of the test workpiece 21. The contour sections can, for example, enable the B- and C-axis calibration described above.

Especially with regard to the contour examples shown in FIGS. 10C and 11, the front side contour and/or the rear side contour are not necessarily closed contours as long as they can be used to form contour sections for probing.

In addition to the embodiments of the procedure for axis calibration described herein based on three translation axes, analog procedures with, e.g., two translation axes are possible if one does not need to move into the contour and one performs detection optically (e.g., with a camera coaxial to the beam).

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A method for determining a deviation of a spatial orientation of a beam axis of a processing head of a beam processing machine from a nominal orientation of the beam axis, the beam processing machine having a rotation axis that is to be calibrated, and a measuring device, the method comprising:
    cutting, into a test workpiece by the processing head, a first contour section and a second contour section by a processing beam provided by the processing head from a first side and a second side of the test workpiece, respectively, wherein the first side is delimited by a first surface of the test workpiece and the second side is delimited by a second surface of the test workpiece, and each of the first and the second contour sections extends parallel to a nominal orientation of the rotation axis that is to be calibrated;
    probing, by the measuring device and from one side of the test workpiece, the first contour section and the second contour section to determine a spatial position of each of the first and the second contour sections, wherein the measuring device is arranged in an outlet region where the processing beam exits the processing head, and the measuring device comprises a contact surface defined geometrically about the beam axis, and wherein the first and the second contour sections are probed by the contact surface; and
    determining a deviation of the spatial orientation of the beam axis of the beam processing machine from the nominal orientation by comparing the spatial positions of the first and the second contour sections with respective nominal position values assigned to each of the first and the second contour sections, the nominal position values indicating nominal spatial positions of respective contour sections that the processing beam provided by the processing head would cut when operating at the nominal orientation,
    wherein the deviation of the spatial orientation of the beam axis is usable to calibrate the rotation axis.

2. The method of claim 1, wherein the beam processing machine is configured to process the test workpiece by the processing beam provided by the processing head and guided along the beam axis,
    wherein the test workpiece is a plate-shaped workpiece and the first and the second surfaces have surface normals that have a substantially common orientation, wherein the beam processing machine includes at least one translation axis for generating a translational movement between the test workpiece and the beam axis,
    wherein the rotation axis has a rotation range of at least 180° for orienting the beam axis in angular positions about the nominal orientation of the rotation axis, and
    wherein the method further comprises:
        mounting the test workpiece in a support position in which the nominal orientation of the beam axis can be aligned in a first angular position and a second angular position rotated 180° thereto along the orientation of the surface normals for processing the test workpiece,
        positioning the beam axis in a first position in which the nominal orientation of the beam axis is in the first angular position and the processing beam is directed onto the first surface,
        performing a first contour cut with the processing beam, wherein the first contour section is a part of the first contour cut,
        positioning the beam axis in a second position in which the nominal orientation of the beam axis is in the second angular position and the processing beam is directed onto the second surface, and
        performing a second contour cut with the processing beam, wherein the second contour section is part of the second contour cut and the second contour section is parallel to the first contour section,
    wherein at least one recess is formed in the test workpiece, the recess borders at least on one of the first contour section and the second contour section,
    wherein the first contour section and the second contour section are probed by the measuring device positioned in the same angular position for detecting the spatial position of the first contour section and the spatial position of the second contour section.

3. The method of claim 2, wherein the deviation of the spatial orientation of the beam axis of the beam processing machine from the nominal orientation is determined in a plane that is perpendicular to the orientation of the surface normals and perpendicular to the nominal orientation of the rotation axis, and perpendicular to the first and the second contour sections.

4. The method of claim 1, wherein the beam processing machine includes one or more beam guiding components that guide the processing beam out of the processing head, and
    wherein, when the first contour section is being cut, the beam guiding components are positioned at the first side of the test workpiece and, when the second contour section is being cut the beam guiding components of the beam processing machine are positioned at the second side delimited by the second surface, and,
    during both probing processes of the first and the second contour sections, the beam guiding components are positioned at only one of the first side and the second side of the test workpiece.

5. The method of claim 1, wherein determining the deviation comprises:
    detecting a distance dimension between the first contour section and the second contour section, and
    determining a difference between the distance dimension and a nominal distance dimension, the nominal distance dimension being a difference between the nominal position values.

6. The method of claim 1, wherein at least one of a first contour cut and a second contour cut forms a recess, wherein the first contour section is part of the first contour cut and the second contour section is part of the second contour cut, and
wherein the first contour cut and the second contour cut are closed contours, which are arranged next to one another in such a way that the first contour section and the second contour section are arranged to be separated by a portion of the test workpiece from one another, or are arranged to be separated from one another by a portion of the test workpiece and cut out regions of at least one of the first and the second contours.

7. The method of claim 1, wherein the first contour section is part of a first contour cut and the second contour section is part of a second contour cut, and
wherein the first contour cut and the second contour cut intersect with each other or form a closed contour together in which the first contour section and the second contour section are disposed on opposite sides of a cut-out region.

8. The method of claim 1, wherein the beam processing machine has two rotation axes whose nominal orientations are arranged orthogonally to one another,
wherein the first contour section is part of a first contour cut and the second contour section is part of a second contour cut, and
wherein each of the first and the second contour cuts has at least one portion along each of the nominal orientations of the rotation axes such that the first and the second contour cuts have a pair of parallel contour sections, which are each parallel to the corresponding nominal orientation.

9. The method of claim 1, wherein the contact surface is geometrically defined in and against a direction of rotation of the rotation axis to be calibrated, and the method further comprises
determining a center between the first and the second contour sections and
comparing the center with a nominal center to determine a beam offset of the processing beam with respect to the nominal orientation, the nominal center being a centerline between the nominal position values.

10. The method of claim 9, wherein the contact surface extends in parallel to the nominal orientation of the beam axis.

11. The method of claim 1, wherein the measuring device comprises a measuring nozzle or a measuring nozzle extension.

12. The method of claim 1, wherein the measuring device comprising a measuring element positioned at an outlet region where the processing beam exits the processing head.

13. A beam processing machine for processing a workpiece comprising:
a workpiece support to support a test workpiece;
a beam guiding system including a processing head that provides a processing beam that cuts into the test workpiece, the processing beam being guided along a beam axis, the beam processing machine having at least one translation axis for producing a translation movement between the test workpiece and the beam axis; at least one rotation axis with a rotation range of at least 180° for orienting the beam axis in angular positions about a nominal orientation of the at least one rotation axis, wherein the beam guiding system is configured to cut multiple contour sections by the processing beam into the test workpiece from a first side and a second side of the test workpiece, wherein the first side is delimited by a first surface of the test workpiece and the second side is delimited by a second surface of the test workpiece, and the first and the second contour sections extending parallel to the nominal orientation of the rotation axis;
a measuring device to probe, from one side of the test workpiece, respective edges of the multiple contour sections cut in the test workpiece by the processing beam provided by the processing head to determine spatial positions of the edges, wherein the measuring device is arranged in an outlet region where the processing beam exits the processing head, and the measuring device comprises a contact surface defined geometrically about the beam axis, and wherein the multiple contour sections are probed by the contact surface; and
a control device configured to determine a deviation of a spatial orientation of the beam axis from a nominal orientation of the processing beam by comparing the spatial positions of the edges with respective nominal position values assigned to each of the edges, the nominal position values indicating spatial positions of respective edges that the processing beam would cut when operating at the nominal orientation,
wherein the deviation of the spatial orientation of the beam axis is usable to calibrate the rotation axis.

14. The beam processing machine of claim 13, wherein the measuring device is attachable as a measuring nozzle or as a measuring nozzle extension to a processing head of the beam processing machine that is located in the outlet region, and the contact surface is defined geometrically about the nominal beam axis.

15. The beam processing machine of claim 13, wherein the contact surface extends parallel to the beam axis of the processing beam for approaching edge sections of the edges cut into the workpiece.

16. The processing beam machine of claim 15, wherein the contact surface is a cylinder shell surface that extends at a distance R about the nominal beam axis that forms as a cylinder axis of the contact surface.

17. The beam processing machine of claim 13, wherein the beam guiding system is adapted to provide a nominal laser beam path, which extends along a first axis of rotation to a first deflecting mirror, along a second axis of rotation to a second deflecting mirror and then along an ideal beam path through a nozzle,
wherein the beam guiding system comprises at least one angular gear that is designed such that the first deflection mirror is rotatable about the first axis of rotation or the second deflection mirror is rotatable about the second axis of rotation.

* * * * *